July 31, 1956  F. A. STEINHILPER  2,756,676
METHOD FOR THE PRODUCTION OF ELECTROPHOTOGRAPHIC PRINTS
Filed May 4, 1953

INVENTOR
Frank A. Steinhilper

2,756,676

METHOD FOR THE PRODUCTION OF ELECTROPHOTOGRAPHIC PRINTS

Frank A. Steinhilper, Rochester, N. Y., assignor to The Haloid Company, Rochester, N. Y., a corporation of New York Application May 4, 1953, Serial No. 352,725

3 Claims. (Cl. 101—426)

This invention relates in general to electrophotography, otherwise known as xerography, and in particular to a new and improved method and apparatus for reproduction of a plurality of xerographic reproductions.

In xerography, as originally disclosed by Carlson in United States Patent 2,297,691, a reproduction of an optical image is produced by electrical means. The usual operation includes sensitizing a photoconductive member by imposing an electric charge thereon, selectively dissipating this charge by exposure to an optical image, and depositing an electroscopic material thereon to yield an image body corresponding to the electrical image. This material image or image body may then be usefully transferred to a second surface such as, frequently, a paper member to yield a xerographic print or picture. The photoconductive member is not destroyed by the process but on the contrary is capable of being reused for a multiplicity of cycles to provide a multiplicity of xerographic pictures corresponding to desired optical images.

According to the present invention, xerography is improved or modified to afford a method, and apparatus for producing a plurality or multiplicity of xerographic prints or pictures from a single exposure to an optical image.

Xerography is further improved or modified to afford a method and apparatus for producing a denser print or picture or denser prints or pictures. It is therefore an object of the present invention to provide method and apparatus for the reproduction of a plurality of xerographic prints or pictures.

It is another object of the invention to provide apparatus for the reproduction of a plurality of xerographic prints or pictures from a single exposure to a master or optical image.

It is a further object of the invention to provide a new and improved method of xerographic reproduction whereby a plurality of xerographic prints or pictures can be reproduced through a method or mechanism in which a partial residual image is employed as a master for subsequent cycles of operation.

It is a still further object of the invention to provide a new and improved xerographic apparatus for the reproduction of a plurality of prints or pictures from a single exposure to a master or optical image wherein a residual or partial image is employed as a master image body in second and subsequent cycles.

It is a still further object of the invention to provide a new and improved xerographic apparatus for the production of a denser original picture or print wherein the image is employed as a master for a subsequent cycle.

It is a still further object of the invention to provide a new and improved xerographic apparatus for the production of denser pictures or prints wherein the image or residual image is employed as the master for subsequent cycles.

Other objects of the invention are in part obvious and will in part become apparent from the following specification and the drawings in which.

Figure 1:
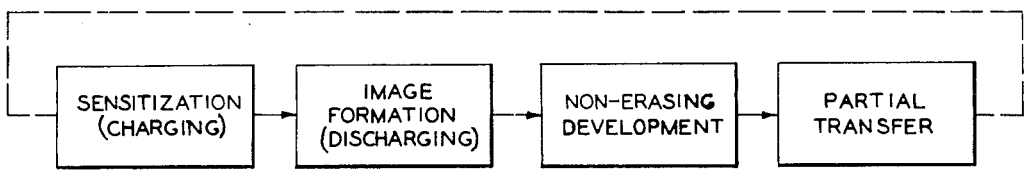
Figure 1 is a block diagram of the new and improved xerographic process.

The new improved process as diagrammatically set forth in Figure 1 comprises the four basic steps of sensitization, image formation, non-erasing development and partial transfer, carried out through a plurality of cycles to form a plurality of xerographic prints or pictures from a single exposure to an optical image.

The sensitization, which may otherwise be called charging, comprises the formation of an electrostatic charge across the surface of the xerographic member. This xerographic member comprises a photoconductive insulating layer disposed on a conductive backing member and thus is characterized by the ability to retain the charge in the absence of illumination and to selectively dissipate the charge when exposed to a light or optical image.

An electrostatic charge pattern or electrostatic latent image is formed by exposing the sensitized xerographic plate to a light pattern or optical image. This latent image is capable of being developed to form an image body.

The next step in the combination process is an image body formation step or development step, wherein the electrostatic latent image is transformed into the image body by deposition of electroscopic material, preferably a highly colored powder or mist material. The electroscopic material desirably bears a charge opposite to the charge on the electrostatic latent image, whereby it is selectively deposited on the image portions, although it is to be understood, of course, that variations such as charging of like polarity may be employed. Various methods of deposition may be employed, such as, for example, deposition of a charged powder composition from a powder cloud or the like, deposition from a charged mist bearing particles such as, for example, highly colored electroscopic material, or deposition by bringing into contact with the image surface a carrier body having charged electroscopic particles thereon. It is not desired to restrict the present invention to any particular form of development since suitable forms are disclosed, for example, in Carlson Patent 2,221,776, wherein powder cloud methods are shown for presentation of electroscopic material to an electrostatic latent image and Carlson Patent 2,297,691, wherein both powder and spray methods are disclosed. Another method which has proved advantageous is disclosed and claimed in a co-pending application wherein a cloud of powder material is formed by projecting a stream of air through a powder body and the cloud is electrostatically charged by traversing a corona discharge zone. It is to be observed with any of the chosen methods of development that care must be taken for reasons set forth hereinafter to employ a non-erasing type of development wherein the act of development does not substantially remove from the image surface significant portions of image body previously deposited thereon.

The next step in the cycle, which may be considered the final step inasmuch as it results in the production of a usable xerographic print or picture, is a step of partial transfer of the image body to a second surface such as, for example, a paper sheet, web, or the like. In this step a fraction of the image body is removed from the xerographic plate or image bearing surface and placed on a second surface which desirably may be the support member for the xerographic picture. Various methods may be used to accomplish this result, such as, for example, transferring to a slightly moistened sheet material such as paper, cloth, or the like, which accomplishes adhesive transfer of a portion of the image body to such material. A particularly useful and presently preferred embodiment of the transfer operation comprises electrostatic transfer wherein a transfer member is placed contiguous to the image bearing surface and an electric charge is deposited on the reverse side of such transfer member, for example, from an adjacent ion source such as a corona discharge electrode or the like placed closely behind the transfer member. Such ion source may be similar to the charging source employed for sensitization of the xerographic plate and may comprise one or more fine conductive strands or series of needles, etc., maintained at a high electric potential with respect to the backing of the image bearing surface, whereby corona discharge occurs resulting in deposition on the transfer member of ionized particles which serve to charge this member. The transfer member is charged to a polarity opposite to the charge on the image body.

The cycle thus described may be repeated through a series of operations to yield a plurality of xerographic prints or pictures corresponding to a single exposure to an optical image. In this connection, particular attention is directed to the image formation or second step of the cycle which was only briefly touched upon in the preliminary discussion. In an original step this image formation comprises selective charge formation by selectively depositing a charge on the surface, or preferably, by exposure of the charged or sensitized xerographic photosensitive member to a light or optical image or other means for selective discharge of the sensitized member, leaving an electrostatic latent image. In the first cycle of operation this electrostatic latent image is developed and partially transferred, whereby there is formed a photosensitive xerographic member having on its surface a residual image body comprising electroscopic material on the surface of the body and corresponding to the charge pattern of the electrostatic latent image. This new composite member, comprising the photosensitive member having this partial image body on its surface, is, in the second and subsequent cycles, carried through the four steps of sensitization, image formation, development and partial transfer.

In the first step of sensitization, an electrostatic charge is deposited on the photosensitive member and the partial image body alike yielding a uniformly charged latent image surface of charged photoconductive layer and charged partial image layer disposed thereon. The new composite member is then subjected to the image formation step of the cycle which comprises selective discharging of the non-image portions by exposure of such portions to light whereby the electrostatic charge thereon is selectively dissipated. Unlike the photosensitive member which is photoconductive, the charged partial image layer retains its electrostatic charge when illuminated by light or other activating radiation and accordingly, a preferred embodiment of the invention contemplates that the image formation or discharging is accomplished by illuminating the entire surface of the xerographic plate with light or other activating radiation whereby the xerographic plate itself becomes photoconductive and dissipates the electrostatic charge and whereby the charged image body does not become photoconductive and therefore retains its electrostatic charge. Thus emerging from the image formation operation the new member comprises a xerographic member having a photoconductive layer on a conductive backing which photoconductive layer is discharged but which supports thereon a charged image body, which charged image body forms an electrostatic latent image for development in subsequent steps of the operation.

Figure 2:
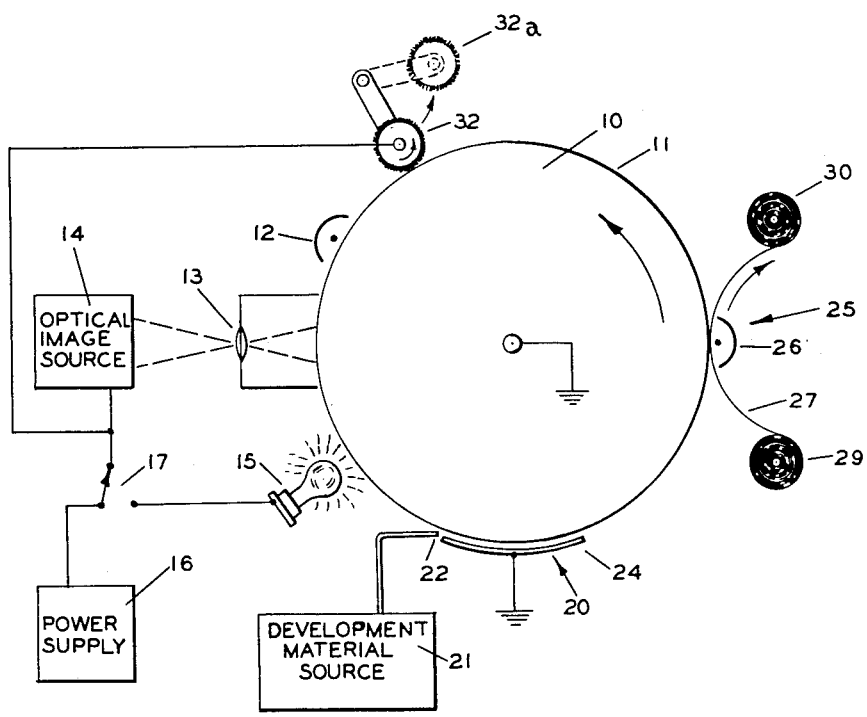
Figure 2 is a diagrammatic view of xerographic apparatus according to one embodiment of the present invention.

In Figure 2 there is shown diagrammatically a machine for the operation of this new and improved process. This machine comprises in general a xerographic member 11 such as a cylinder or the like which is mounted to be moved through a plurality of xerographic stations. Positioned at a desired point adjacent to the path of motion of this member 11 is a charging station 12 which may desirably be a corona discharge electrode or the like. Next subsequent thereto in the path of motion of the xerographic member is optionally an exposure station 13. This exposure station may be one of a number of types of mechanisms or members such as desirably an optical projection system or the like whereby an optical image is projected onto the surface of the photosensitive member. Very desirably this exposure station may comprise an optical image source 14 from which an optical or light image is projected and a slit projection lens arrangement designed to project a line projection onto the surface of a photosensitive member.

Positioned next adjacent to the charging or sensitization station 12 or the exposure station 13 (if used) is a flood light station 15 or the like in which the xerographic image member is flooded with light to cause dissipation of electrical charge from the surface thereof. Desirably, this flood light station 15 may be any light source positioned to brightly illuminate the surface of the photosensitive member. According to the embodiment described in Figure 2, the floodlight source 15 and the optical image source 14 may be connected to a power supply 16 such as an electric power source through a selector switch 17 which selectively energizes either the optical image source or the flood light but not both of them simultaneously. In this manner either station 13 or station 15 is energized during a specific cycle of operation but not both.

Positioned next adjacent to the image formation stations 13 or 15 is a development station generally designated 20. This station comprises generally a source of development material 21 such as a source of a cloud of electroscopic powder particles and a suitable conduit 22 designed to carry the development material from the source to the development zone. According to the specific embodiment shown in Figure 2 this development zone comprises an extremely narrow space between the photosensitive xerographic member 11 and a development electrode 24 mounted in close proximity thereto. Desirably, this development electrode is a conductive area connected to ground potential or to other desired potential.

Next adjacent to the development zone in the path of motion of the photosensitive xerographic member in the machine described in Figure 2 is a transfer station generally designated 25. This transfer station comprises essentially a charging member 26 such as, for example, a corona discharge source or electrode, and a source of a transfer material 27 which may optionally be positioned on a supply roll 29 and a pick-up roll 30. This transfer station 25 is particularly adapted to accomplish partial transfer of the developed image body from the photosensitive surface or member to the transfer member 27, leaving a residual image on the photosensitive surface.

The next and final station in the device described in Figure 2 is a cleaning station 32 optionally positioned between the transfer station 25 and the charging or sensitization station 12. This station 32 like the exposure station 13 is optional and desirably is mounted to be switched or moved between an operating and a non-operating position as illustrated at 32A. In use and operation the charging or sensitization electrode 12 is energized and the photosensitive member 11 is passed thereunder whereby this member receives a charge across its surface area. During the first cycle of the operation the cleaning station 32 may, if desired, be operated to remove traces of residual image from previous operations and the optical image source 14 is energized to project a light image onto the photosensitive member causing selective dissipation of charge and consequent formation of an electrostatic latent image. During this first cycle of operation the flood light station 15 is de-energized whereby this electrostatic latent image is retained and is carried to the development station 20. At the development station the development material is activated depositing electroscopic material on the xerographic photosensitive member to yield an image body corresponding to the optical image projected thereon at exposure station 13. The photosensitive member bearing the image body then passes to the transfer station at which point partial transfer to the transfer member 27 is accomplished, thus forming a finished xerographic print or picture on said member and leaving a residual image body on the xerographic photosensitive member. In the subsequent cycles thereafter cleaning station 32 is de-energized and the optical image source 14 optionally is also de-energized whereby the photosensitive member is carried through the charging and sensitization station 12, the flood lamp or image formation station 15, the development station 20 and the partial transfer station 25 in a series of successive cycles. In each of these cycles the photosensitive member and the residual image carried thereby are charged at charging or sensitization station 12 and the photosensitive member but not the residual image body is discharged at the image formation station 15. The remaining charged residual image body is then developed at development station 20 and the usual partial transfer occurs at transfer station 25 leaving substantially an identical residual image body on the photosensitive member as such member leaves the transfer station. During successive cycles selector switch 17 will be interlocked with a counting member or device for the selective repetition of the series of cycles to a desired number for the reproduction of a selected number of copies of an individual original or optical image to be reproduced.

It is to be recognized that this invention can also be employed to increase the density of a weak or flat original or residual image. In such a case, a weak developed original or a weak developed residual image can be regarded as equivalent to the residual image on the photosensitive surface after partial transfer. Thus, a weak or flat original or residual image is one whose density is too low to form a satisfactory print, and the density of such an image can be increased by a cycle of operation as illustrated in this invention. According to one embodiment hereof, a low density developed image or developed residual image on a conductive or photoconductive base member is substituted for the residual image on its photoconductive surface, and this developed image or developed residual image is carried through the charging or sensitization stage, then through the image formation stage, if the backing member is photoconductive, wherein the surface is flooded with light to selectively dissipate the charge on all areas except the image or residual image areas, then through the development zone where the additional image material is deposited on the charged image or residual image body, and then through the transfer station where partial transfer occurs.

It will be realized that numerous variations and modifications of the basic mechanism of Figure 2 may be made within the scope of the present invention. Thus, for example, the charging station 12 may according to the presently preferred embodiment of the invention be a corona discharge electrode or the like designed and constructed to deposit an ion discharge preferably of positive polarity on the photosensitive member 11. Alternatively, other ion sources may be used such as, for example, an ion wind radioactive discharge or the like. Likewise, if desired, other charging methods may be employed such as conductive or inductive charging provided such charging methods do not inherently disturb or distort the position or formation of the residual image body on the surface of the photoconductive or photosensitive member. In a like manner any of a number of optical image sources may be employed at station 13. Thus, if desired, the member to be reproduced, such as, for example, a typed document or the like, may be brought into contact or near contact with the xerographic member 11 and illuminated from the rear whereby photographic exposure to the original is accomplished. In comparable manner an optical image may be projected onto the surface by placing the document or other article to be reproduced in a position to be focused on the photosensitive member 11 and flattened stroboscopic lights or the like to project its image through a lens onto the surface. Likewise, if desired, and if suited to other mechanisms employed, the motion of the photosensitive member 11 may be arrested for a prolonged exposure at the exposure station 13. Generally, however, it will be found particularly suitable when employing a cylindrical or rotary type photosensitive member to employ a form of strip exposure wherein the member being optically reproduced or a segment of it is exposed stripwise to the photosensitive xerographic member to yield the desired electrostatic latent image corresponding to the optical image. Thus, in the case of a document being reproduced, the document may be scanned by an exposure mechanism to project such images onto the photosensitive member.

It is to be understood that the photosensitive member may be separable from the mechanism and may be separately exposed to an optical image suitable during the charging operation which likewise may be either separate or may be a part of the machine described in Figure 2, such separately exposed xerographic member may then be fastened onto a cylindrical surface or cylinder 10 and subjected to the cycles of operation. If such method be employed, of course, the exposure station 13 may be eliminated or inactivated.

The development station 20 similarly is capable of wide variation. The fundamental requirement at this station is that the development be of the non-erasing type whereby the residual image body is not disturbed during development. In general, this leads to a preferred embodiment of the invention wherein the electroscopic material in air suspension or the like is brought into close proximity with the image bearing surface and is deposited thereon by electrostatic attraction. Desirably a dry powdery electroscopic material may be formed into the powder cloud suspension and this suspension charged to polarity opposite to the polarity of sensitization member 12 (thus, generally negatively), and the charged cloud presented to the image surface. An optional structure at the development station is the counter-electrode or development electrode 24 which serves to improve the quality of the developed image, improving the correlation between the electrostatic latent image or image pattern and the deposition of electroscopic material thereon. If this is not, however, essential, the electrode 24 may be omitted and the electroscopic material presented directly to the image bearing surface as indicated, for example, in Carlson Patent 2,297,691. It will be understood, of course, that the electroscopic material may be finely divided powder particles or a finely divided mist or the like such as, for example, a solvent mist bearing pigmented particles.

It is further apparent that in this development station 20 there must be presented to the image bearing surface electroscopic particles which are highly insulating or non-conductive in character. Thus, the conductivity of the residual image body on the photosensitive member must be non-existent to the extent that the charge deposited thereon at sensitization station 12 is substantially retained at least until the charged image body is carried into the development station 20. This, therefore, requires that the electroscopic material be an extremely good insulator since charge dissipation can occur over a relatively wide area and only an extremely good insulator can resist such dissipation. A developer composition which has been found satisfactory for this invention is a pigmented resin composition consisting of colored or pigment particles bound in an insulating resin binder or matrix, preferably finely divided to an average particle size substantially smaller than 20 microns. Generally, any good insulator will serve as the pigment binder including such material as polystyrene, and styrene copolymers, polymerized acrylic acids, esters and amides such as, for example, polymethylmethrocylate and the like, ureaformaldehyde and phenolformaldehyde resins, or modified resins such as, for example, rosin modified phenolformaldehyde resins and the like and other synthetic resins such as nylon, butadiene and butadiene polymers and copolymers and the like.

The transfer station 25 according to the presently preferred embodiment of the invention comprises a charging corona discharge electrode 26 which may be generally comparable to and similar to the charging electrode 12 at the sensitization station and as such may be modified similarly with the modification of electrode or device. If desired, it is to be understood that mechanical partial transfer mechanisms may be employed such as, for example, transfer by contact with a mildly adhesive surface such as a sheet or web slightly moistened with a liquid such as water or a solvent. Thus, for example, if a small portion of a solvent is employed in conjunction with a sheet or web member for transfer suitable adjustment of the amount of solvent will yield partial transfer of the image body. If the solvent tends to remain on the image bearing surface or photosensitive member 11 after leaving the partial transfer station 25 such residual liquid or solvent can be dissipated by evaporation to present at the subsequent operations a substantially dry non-tacky residual image body.

What is claimed is:

1. A method for the production of a plurality of electrophotographic prints from an electrostatic latent image comprising forming an electrostatic latent image on the surface of a photoconductive insulating member, depositing powder particles on said member in conformity with the electrostatic latent image to form an image pattern thereon comprising areas of image body and areas of background, said areas of image body comprising loose powder particles adhering to the electrostatic latent image substantially by the electrostatic attraction of said image, partially transferring said image body to a second surface yielding an electrophotographic print on said second surface while leaving the remainder of said image body as a residual image on the photoconductive member, said residual image body comprising the remaining loose powder particles adhering to the surface of the photoconductive insulating member in conformity with the electrostatic latent image following partial transfer of the image body, and thereafter in at least one successive cycle depositing electrostatic charge on said residual image comprising the remaining loose powder particles and on the photoconductive member, exposing the image pattern bearing photoconductive member to uniform light whereby the electrostatic charge is dissipated in the background areas, depositing additional powder particles on the surface of the photoconductive insulating member by electrostatic deposition on the charge bearing residual loose powder particle image body to form a second image body comprising loose powder particles electrostatically adhering to the surface of the photoconductive insulating member conforming to said electrostatic latent image, said loose powder particles of said second image body comprising said powder particles of said residual image body intermixed with the additionally deposited powder particles and partially transferring said second image body to a second surface to form an electrophotographic print.

2. A method for the production of an intensified electrophotographic print from an electrostatic latent image comprising forming an electrostatic latent image on the surface of a photoconductive insulating member, depositing powder particles on said member in conformity with the electrostatic latent image to form an image pattern thereon comprising areas of image body and areas of background, said areas of image body comprising loose powder particles adhering to the electrostatic latent image substantially by the electrostatic attraction of said image, depositing an electrostatic charge on the surface of the photoconductive insulating member and on the image body of loose powder particles thereon, exposing the image pattern bearing photoconductive member to uniform light whereby the electrostatic charge is dissipated in the background areas, and depositing additional powder particles on the surface of the image pattern bearing photoconductive member by electrostatic deposition on the charge bearing loose powder particle image body to form a denser image body, said denser image body comprising said loose powder particles of said image body intermixed with the additionally deposited powder particles.

3. A method for the production of a plurality of intensified electrophotographic prints from an electrostatic latent image comprising forming an electrostatic latent image on the surface of a photoconductive insulating member, depositing powder particles on said member in conformity with the electrostatic latent image to form an image pattern thereon comprising areas of image body and areas of background, said areas of image body comprising loose powder particles adhering to the electrostatic latent image substantially by the electrostatic attraction of said image, depositing an electrostatic charge on the surface of the photoconductive insulating member and on the image body of loose powder particles thereon, exposing the image pattern bearing photoconductive member to uniform light whereby the electrostatic charge is dissipated in the background areas, depositing additional powder particles on the surface of the image pattern bearing photoconductive member by electrostatic deposition on the charge bearing loose powder particle image body to form a denser image body comprising said loose powder particles of said image body intermixed with the additionally deposited powder particles and partially transferring said denser image body to a second surface, leaving a residual image body on the photoconductive member, said residual image body comprising the remaining loose powder particles adhering to the surface of the photoconductive insulating member in conformity with the electrostatic latent image following partial transfer of the denser image body and thereafter in at least one successive cycle depositing electrostatic charge on said residual image comprising the remaining loose powder particles and on the photoconductive member, exposing the residual image bearing photoconductive member to uniform light whereby the electrostatic charge is dissipated in the background areas, depositing additional powder particles on the surface of the photoconductive insulating member by electrostatic deposition on the charge bearing residual image body to form a second image body comprising loose powder particles electrostatically adhering to the surface of the photoconductive insulating member conforming to said electrostatic latent image, said loose powder particles of said second image body comprising said powder particles of said residual image body intermixed with the additionally deposited powder particles, and partially transferring said second image body to a second surface to form an electrophotographic print.

References Cited in the file of this patent

UNITED STATES PATENTS

| | | |
|---|---|---|
| 2,221,776 | Carlson | Nov. 19, 1940 |
| 2,297,691 | Carlson | Oct. 6, 1942 |
| 2,357,809 | Carlson | Sept. 12, 1944 |
| 2,573,881 | Walkup et al. | Nov. 6, 1951 |

(Other references on following page)

UNITED STATES PATENTS

| | | |
|---|---|---|
| 2,624,652 | Carlson | Jan. 6, 1953 |
| 2,659,670 | Copley | Nov. 17, 1953 |
| 2,681,473 | Carlson | June 22, 1954 |
| 2,693,416 | Butterfield | Nov. 2, 1954 |
| 2,703,280 | Butterfield et al. | Mar. 1, 1955 |

OTHER REFERENCES

New Developments in Xeroradiography—Non-Destructive Testing—Summer 1951, vol. 10, No. 1, pages 8–25, page 18 particularly relied upon.